United States Patent [19]

Wolstenholme

[11] Patent Number: 4,493,248

[45] Date of Patent: Jan. 15, 1985

[54] STORAGE SYSTEM FOR GRANULAR MATERIALS

[76] Inventor: Paul P. Wolstenholme, c/o Super C Products Company, 229 S. Main St., P.O. Box 36, West Mansfield, Ohio 43358

[21] Appl. No.: 542,339

[22] Filed: Oct. 17, 1983

Related U.S. Application Data

[62] Division of Ser. No. 395,547, Jul. 6, 1982, Pat. No. 4,454,807.

[51] Int. Cl.³ .................. B65G 3/00; B65D 88/16; A01F 25/14
[52] U.S. Cl. ........................................ 98/52; 98/55; 366/101
[58] Field of Search ............... 99/467, 516, 471, 534, 99/488, 646 R, 646 S, 473–476; 366/101, 106, 107; 414/287, 292, 325, 326, 418, 919; 98/1.5, 52, 55; 150/0.5, 1; 52/2, 63, 192, 224; 34/15

[56] References Cited

U.S. PATENT DOCUMENTS

| | | |
|---|---|---|
| 1,473,845 | 11/1923 | Gardon . |
| 1,730,150 | 1/1956 | Wunderwald et al. . |
| 2,895,400 | 7/1959 | Topf . |
| 3,539,057 | 11/1970 | Bronner . |
| 3,727,656 | 4/1973 | Luders . |
| 4,121,389 | 10/1978 | Ptaszek . |

FOREIGN PATENT DOCUMENTS

WO81/03650 12/1981 PCT Int'l Appl. .

*Primary Examiner*—Timothy F. Simone
*Attorney, Agent, or Firm*—Biebel, French & Nauman

[57] ABSTRACT

A storage system for large quantities of flowable, granular materials, such as grain. The material is covered by flexible cover sections which are spread out on an impervious support surface and thereafter laced together to define a cover having a centrally located opening. The cover is grasped in the region of the central opening and lifted to a predetermined fill height; the perimeter of the cover being free to pull inwardly as necessary accommodating the lifting. Thereafter, the granular product is introduced into the opening until it reaches the predetermined fill height and defines a pile extending downwardly toward the support surface along a natural angle of repose. As the pile grows, it raises the cover while sweeping it upward away from the center of the pile. By this means the entire finished pile is conformably covered by the cover. After the pile has been established in its final configuration, the perimeter of the cover is fastened down, preferably to a retaining wall surrounding the base of the pile.

6 Claims, 14 Drawing Figures

STORAGE SYSTEM FOR GRANULAR MATERIALS

CROSS REFERENCE TO RELATED APPLICATION

This application is a division of Ser. No. 395,547, filed July 6, 1982, now U.S. Pat. No. 4,454,807.

BACKGROUND OF THE INVENTION

The present invention relates to a system for storing flowable, granular materials, such as grain in large piles which may contain as much as three million bushels of the materials.

Granular materials, such as grain, are generally stored in large commercial elevators or in other permanent structures. During harvesting seasons such permanent storage facilities often times become filled and other storage facilities must be found. Sometimes the grain must be left in the open in uncovered piles thereby causing serious loss due to the elements. Other times the excess grain is stored in small temporary facilities, which may be of either rigid or collapsible construction. Typical examples of collapsible storage facilities are shown in Gardon U.S. Pat. No. 1,473,845, Wunderwald et al U.S. Pat. No. 2,731,050, Bronner U.S. Pat. No. 3,539,057, Luders U.S. Pat. No. 3,727,656, and Ptaszek U.S. Pat. No. 4,121,389.

Wunderwald and Luders both show systems where grain is piled under a flexible cover in supporting relation thereto. The covers have a central opening and are initially in a collapsed condition. The central opening is lifted, and grain is introduced therethrough to form a pile which extends downwardly from the fill point along a natural angle of repose. This angle may be in the order of about 27° for wheat or 22° for corn.

Wunderwald's system includes a flexible bottom portion which is attached to the cover, and the bin which is so defined is secured in place by staking down the margins prior to filling. In the system of Luders the cover is positioned upon an impermeable base. The edges of the cover are joined to the periphery of the base by an adhesive or by heat sealing. Alternatively, the cover is formed integral with the base.

The systems of Wunderwald and Luders both are limited to use for storing relatively small quantities of grain in the order of about 1,000 bushels or less. When the teachings of Wunderwald or Luders are extended to larger size storage operations it is found that the filling opening in the cover cannot be lifted to proper fill height due to the natural sagging of the cover material. For example, a 25,000 bushel pile of corn has a height of about 17 ft. and a diameter of about 84 ft. at the base. The surface area requiring coverage by the cover is about 600 sq. yd., and a suitable cover material for such an area weights over 700 lbs.

Accordingly, it may be appreciated that there has been a need for a readily erectable temporary storage facility for large quantities of flowable granular materials.

SUMMARY OF THE INVENTION

The present invention provides a method and system for storage of flowable granular materials in large piles, preferably larger than about 25,000 bushels up to about 3,000,000 bushels. In the method according to this invention a plurality of mating, flexible and impervious cover sections are positioned upon a suitable support surface and secured together to define a cover having a centrally located opening; the outer perimeter of the cover being free to move. After the cover has been assembled, it is grasped in the region of the central opening and lifted to a predetermined fill height. When the lifting has been completed, the cover sags arcuately downward in a typical catenary curve with the perimeter being pulled inwardly as necessary to accommodate such curvature. Once the cover has been lifted to the predetermined fill height, the granular product is introduced into the opening and filled to define a pile of the desired size. As the pile grows it raises the cover and also carries it outwardly. When filling has been completed the cover is supported by and conformably covers the entire pile. The pile defines a cone with its peak at the fill point. The surface of the pile extends downwardly from the peak at an angle of repose which is normal for the material being piled.

The system which is produced by the method of this invention includes the supporting surface with the granular material piled thereon and covered by the assembled cover. The system also preferably includes a retaining wall around the base of the pile and an aeration tower extending upwardly through the pile from the support surface to the peak thereof. The cover may be attached to the aeration tower and to the retaining wall.

Accordingly, it is an object of this invention to provide an improved method for storing a flowable granular material and a storage system resulting therefrom.

Other and further objects of the invention will be apparent from the attached drawings, the following specification and the appended claims.

DESCRIPTION OF THE PREFERRED EMBODIMENT

Figure 1:
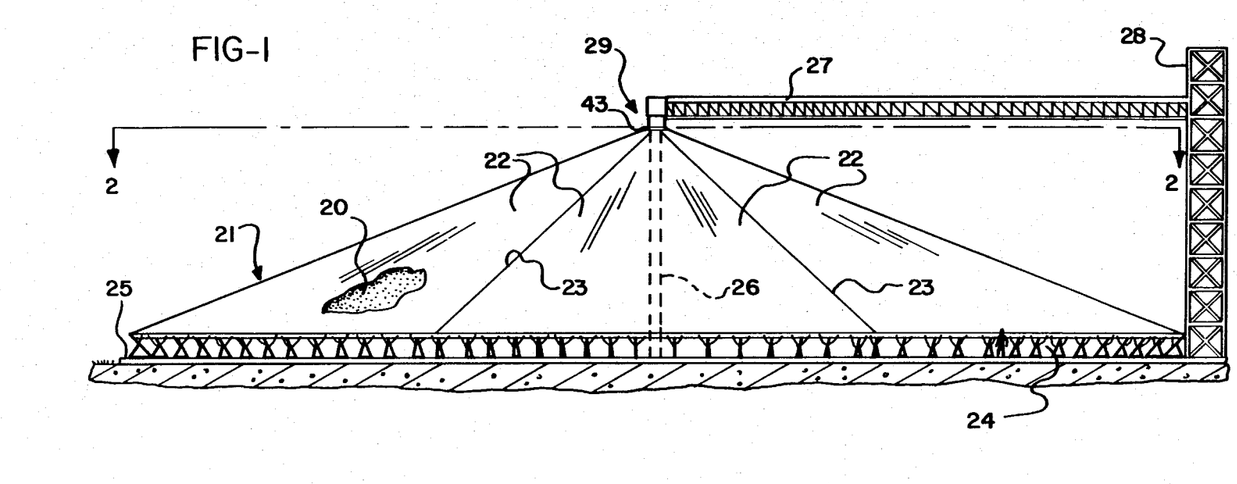
FIG. 1 is a side elevation view of a storage system in accordance with this invention.
Figure 2:
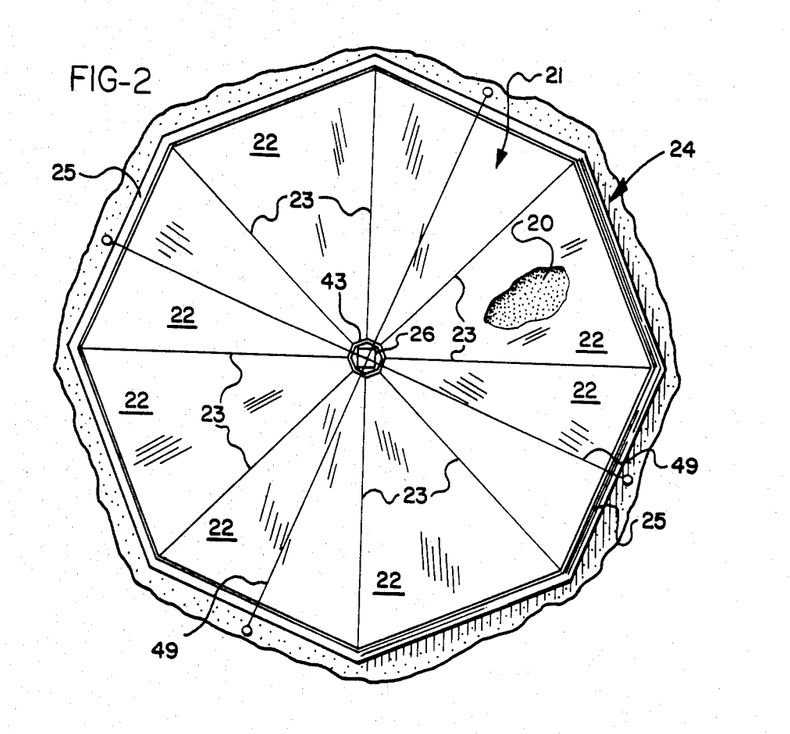
FIG. 2 is a horizontal plan view of the system of FIG. 1.

A typical storage system for storage of about 500,000 bushels of corn is illustrated in the side elevation view of FIG. 1. As shown therein, a pile of corn 20 is covered by a flexible cover 21 comprising a plurality of cover sections 22. One of the cover sections 22 is partially cut away to illustrate the pile of corn 20. In the illustrated embodiment cover 21 comprises eight triangular cover sections 22 as best illustrated in FIG. 2. Cover sections 22 may each have a length of about 80 ft. at their base and a length of about 105 ft. along the edges which extend inwardly therefrom. Cover sections 22 are preferably fabricated from nylon reinforced vinyl having a weight of about 18 ounces per square yard. Accordingly, each of cover sections 22 weighs about 400 lbs. Cover sections 22 are joined along a series of seams 23 as hereinafter described.

The pile of corn 20, with cover 21 stretched conformable thereacross rests upon a support surface 25 and extends theretoward at an angle of repose of about 22° from the horizontal. Support surface 25 may comprise a 5 inch thick layer of conventional blacktop, but other surfaces are satisfactory. It is preferred that support surface 25 be impervious. Preferably a 5 ft. retaining wall 24 retains the pile of grain at its base.

The retaining wall 24 is air permeable for aeration of the grain as hereinafter described. Such aeration is facilitated by an aeration tower 26 which is air permeable and which extends upward through the pile of grain from support surface 25 to the peak 29 of the pile 20. An aeration fan or fans 30 (FIG. 9) of conventional design and capable of moving about 12,500 to 50,000 cubic ft. of air per minute may be mounted at the top of aeration tower 26. When fan 30 is activated it produces a flow of air from retaining wall 24 through the grain pile 20, into aeration tower 26 and upwardly into the atmosphere. As hereinafter described in detail, aeration tower 26 supports cover 21 prior to the introduction of grain. If aeration is not required, then aeration tower 26 may be replaced by a post or any other means capable of providing temporary vertical support.

Figure 9:
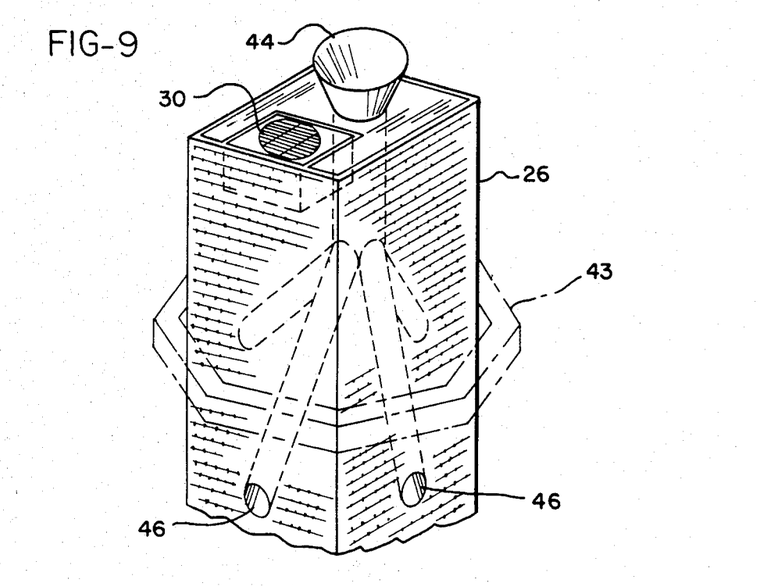
FIG. 9 is a pictorial illustration of a filling spout.

Cover sections 22 are joined to a lifting ring 43, which surround aeration tower 26 at peak 29. A power supply for fan 30 may extend upwardly through aeration tower 26, or alternatively, up an elevator 28 and thence outwardly along a loading conveyor 27. Elevator 28 and conveyor 27 are used for supplying grain to a funnel positioned in aeration tower 26, as best illustrated in FIG. 9.

Figure 3:
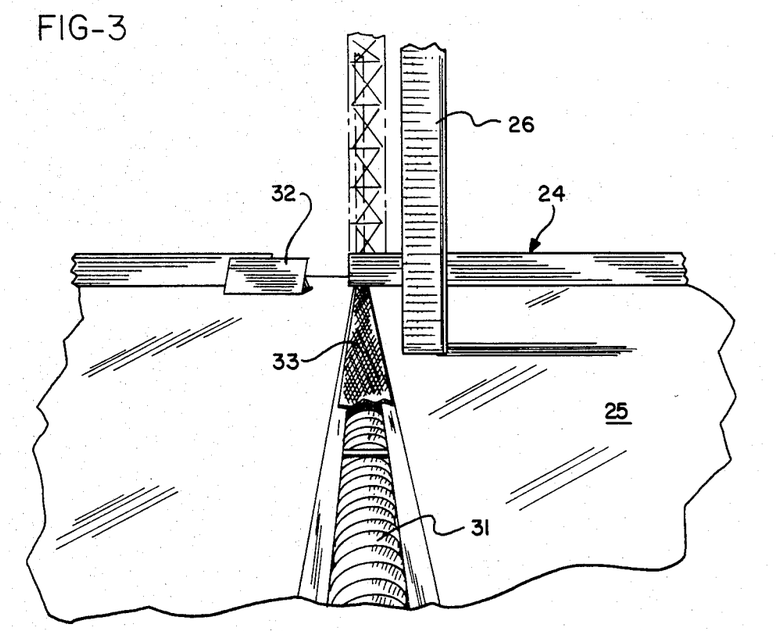
FIG. 3 is a pictorial illustration of a portion of a support surface, retaining wall and aeration tower for use in practicing the present invention.

For ease in unloading grain from the pile 20 there is an unload conveyor 31 in support surface 25, as illustrated in FIG. 3. Approximately 25% of pile will flow under gravity into conveyor 31. The remainder may be unloaded by using a front loader to push grain into the conveyor. In order to provide access to the conveyor 31 for unloading, retaining wall 24 has a removable section 32. Prior to unloading, one of the seams 23 is unfastened and a pair of cover sections 22 are folded backwardly to expose a portion of pile 20 in the area of wall section 32. Preferably, unload conveyor 31 is a screw type conveyor and is provided with a cover screen 33.

Figure 4:
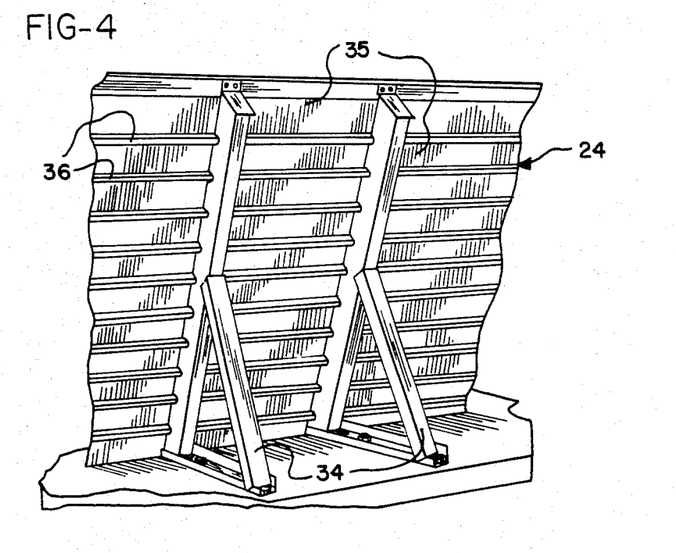
FIG. 4 is a pictorial illustration of a portion of a retaining wall, as viewed from the rear side thereof.

Retaining wall 24 may be supported by a series of steel support braces 34 as best illustrated in FIG. 4. Support braces 34 are covered by retaining plates 35, which may be fabricated from 20 gauge perforated galvanized steel. Retaining plates 35 may be backed by supporting ribs 36.

Figure 5:
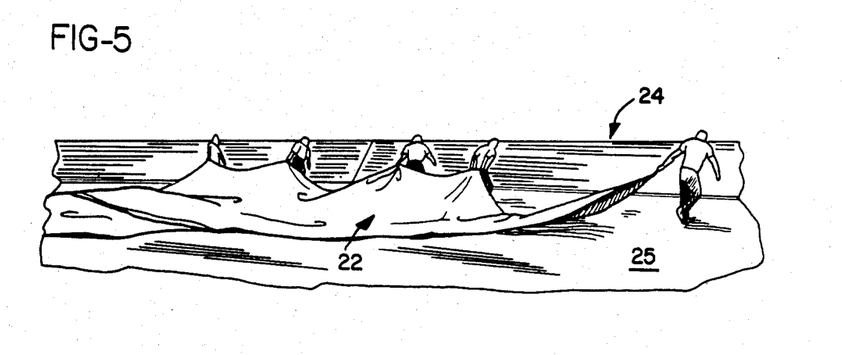
FIG. 5 is a pictorial illustration of the step of placing a cover section upon the support surface of this invention.
Figure 6A:
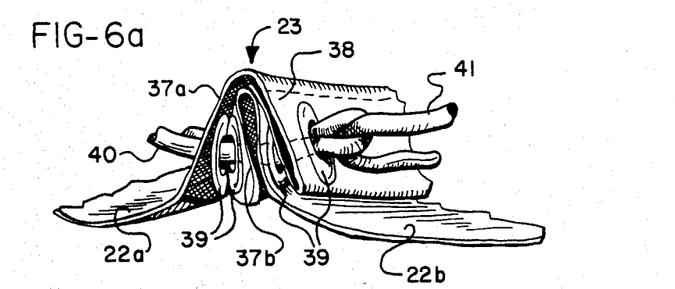
FIG. 6(a) is a sectioned end view of a cover seam.
Figure 6B:
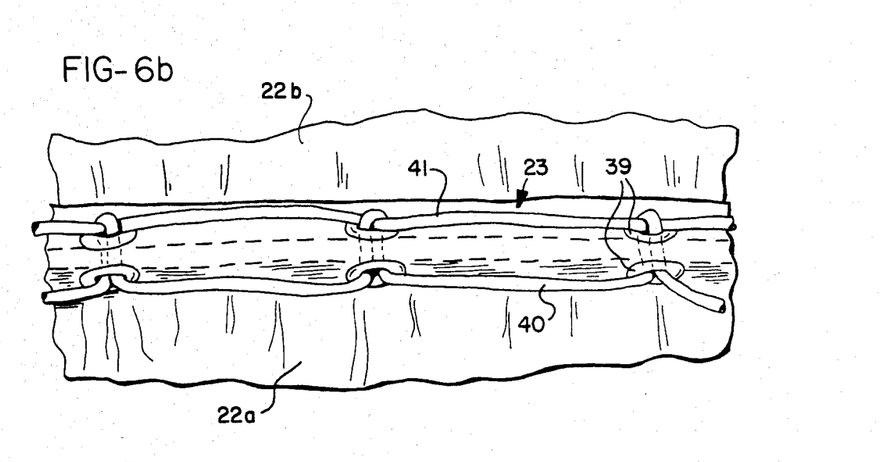
FIG. 6(b) is a plan view of a cover seam.

The system is made ready for storage of grain by spreading the cover sections 22 out on support surface 25. Cover sections 22 are initially folded up and stored on pallets of suitable size. The pallets may be transported to the work site and the cover sections spread out by hand as illustrated in FIG. 5. After being spread out, cover sections 22 are joined to form seams 23, as best illustrated in FIGS. 6(a) and 6(b). A seam 23 is assembled by bringing together mating portions of two cover sections 22(a) and 22(b), as illustrated. Cover section 22(a) has an upwardly folded marginal edge 37(a) and a downwardly extending flap 38 which depends therefrom. Cover section 22(b) has a marginal edge 37(b), which extends upwardly between marginal edge 37(a) and flap 38. Marginal edges 37(a) and 37(b) and flap 38 are provided with a series of grommets 39, which are aligned to define apertures for entry of a first lacing line 40. Lacing line 40 is looped through the aligned grommets 39 and thereafter captured by a second lacing line 41. Lacing lines 40 and 41 preferably are ⅜ inch polypropylene rope. Preferably, margins 37(a) and 37(b) and flap 38 are all reinforced with four inch wide web material.

Figure 7:
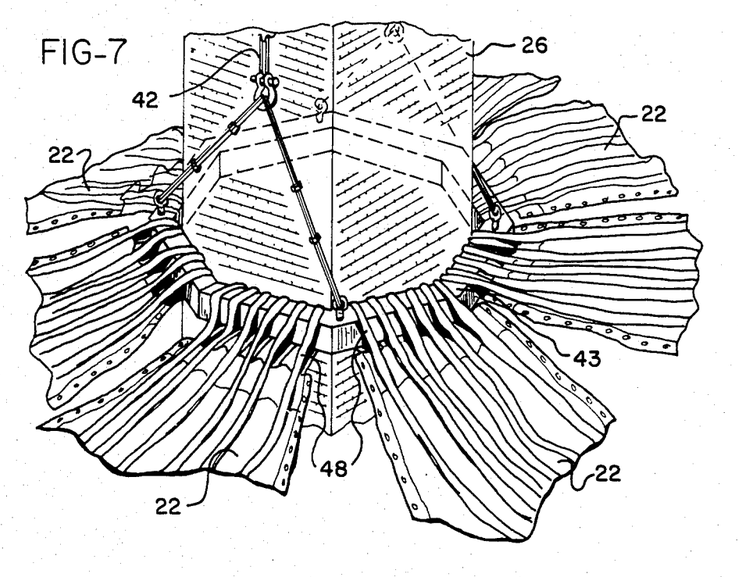
FIG. 7 is a pictorial illustration of a cover being lifted by a lifting ring.
Figure 8:
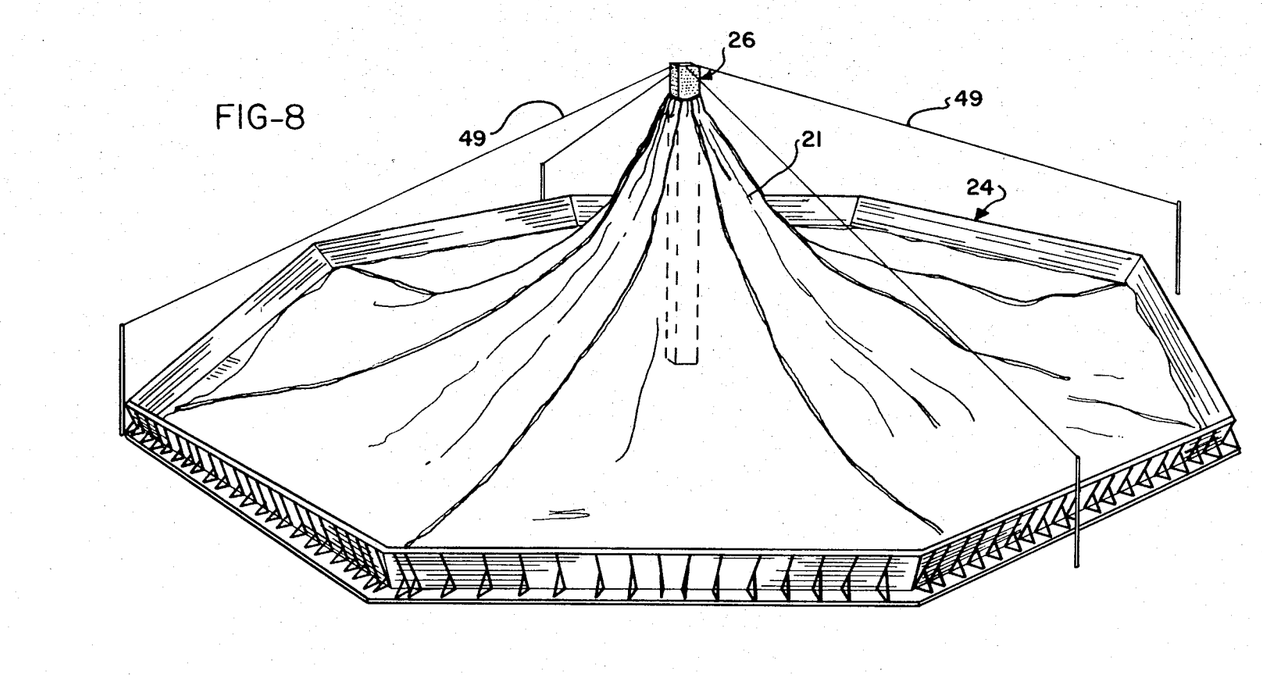
FIG. 8 is a pictorial illustration of the storage system of this invention after erection and prior to introduction of granular material.

After cover sections 22 have been laced together they are attached to lifting ring 43 as illustrated in FIG. 7. Lifting ring 43 may be comprised of two sections which may be joined to fit around aeration tower 26. Cover sections 22 are provided with a series of loops 48, which are passed over lifting ring 43 before the sections thereof are joined. A pair of cables 42 (one of which is visible in FIG. 7) are attached to opposite sides of lifting ring 43, and the lifting ring with the attached cover sections 22 is lifted by a winch (not illustrated). Lifting is continued until the lifting ring has been lifted to a predetermined fill height as illustrated in FIG. 8. The predetermined fill height corresponds to the peak of the pile of grain which will be erected under the cover. In the illustrated embodiment that height may be about 41 ft. Due to the natural tendency of the cover to sag under the force of its own weight, the perimeter of the cover pulls inwardly away from retaining wall 24, as shown in FIG. 8. A series of guy wires 49 may be attached to aeration tower 26 for supporting the structure of this stage.

After cover 21 has been raised to the predetermined height, as described above, the grain loading operation commences. For this purpose a funnel 44 is mounted in the top of aeration tower 26, as illustrated in FIG. 9. Grain which is introduced into funnel 44 exits through four spouts 46 which reach out to the four sides of aeration tower 26 at a point below the final position of lifting ring 43. Funnel 44 is positioned for reception of grain from loading conveyor 27. For the illustrated 500,000 bushel system, loading progresses at the rate of about 8,000 bushels per hour.

Figure 10:
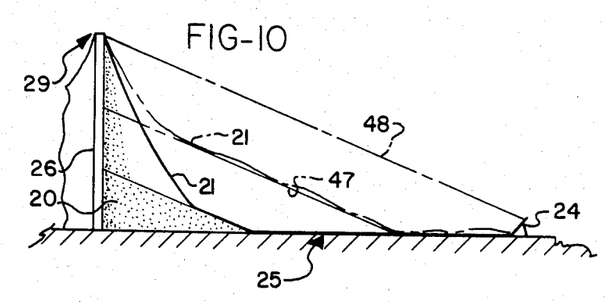
FIG. 10 is a diagrammatic illustration showing the movement of a cover during growth of a pile of granular material.

FIG. 10 illustrates the movement of cover 21 during the course of the filling operation. During the initial stages of filling the pile of grain 20 builds up to the point where it comes into contact with cover 21, as shown in solid lines in FIG. 10. At this point, cover 21 is drawn inwardly from retaining wall 24, as discussed above.

Figure 13:
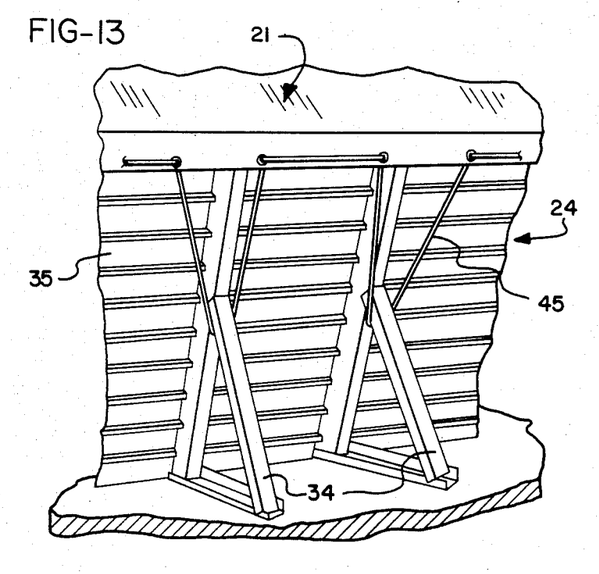
FIG. 13 illustrates means for securing a cover section to a retaining wall.

As the grain moves into contact with cover 21 it flows thereunder and begins lifting the cover upwardly. Concomitantly with this upward lifting the frictional force of the flowing grain carries the cover outwardly. Thus when the grain has built up to an intermediate point as indicated by the reference numeral 47, cover 21 sags downwardly to the pile of grain and thereafter rests partially on the pile and partially on support surface 25. The filling is continued until the grain reaches the pouring point and defines a pile extending along its normal angle of repose in an outward and downward direction. At the point the pile has a configuration as indicated reference numeral 48. By then cover 21 has been carried upwardly and outwardly to stretch conformably over the pile from peak 29 to the wall 24. Cover 21 is pulled over the top of wall 24 and tied down by a tie line 45 as illustrated in FIG. 13. The grain is then fully stored.

Figure 11:
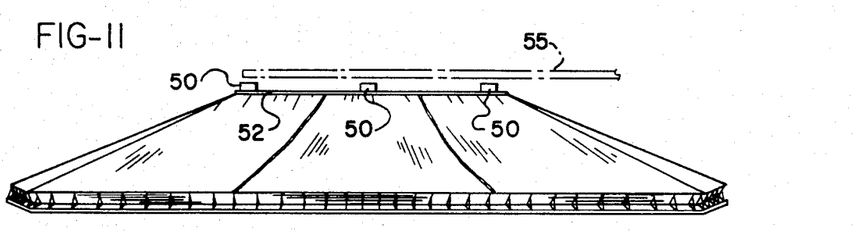
FIG. 11 is a side elevation view of a storage system in accordance with an alternative embodiment of the invention.
Figure 12:
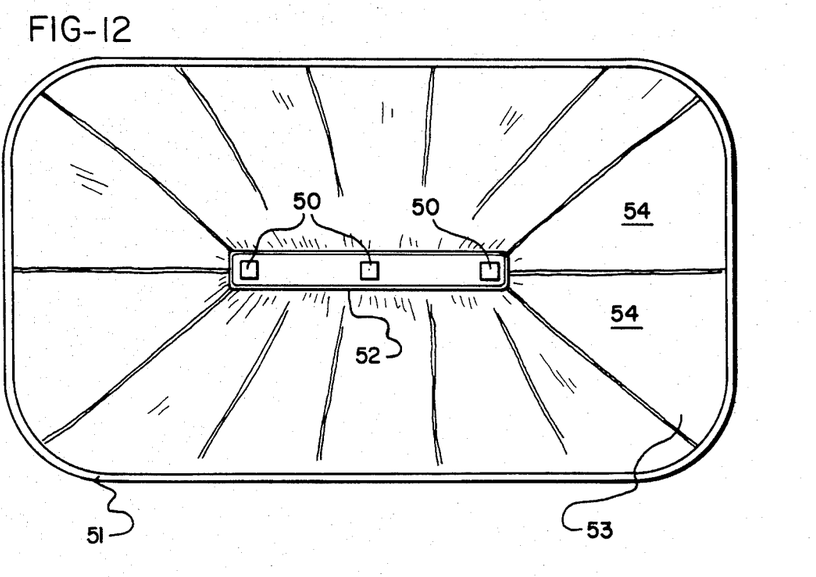
FIG. 12 is a horizontal plan view of the storage system of FIG. 11.

An alternative embodiment of the storage system of this invention is illustrated in FIGS. 11 and 12. The system of FIGS. 11 and 12 is erected and filled as described above for the embodiment of FIGS. 1 and 2. In its alternative embodiment the system may have a racetrack configuration as viewed from above. In the alternative embodiment there are a plurality of aeration towers 50 surrounded by an elongated opening 52 in cover 53. Cover 53 comprises a series of cover sections 54, which are releasably joined together as described above. The perimeter of cover 53 is releasably secured to retaining wall 51. An overhead conveyor 55 is provided for delivering grain to funnels mounted at a proper pouring height within each of aeration towers 50.

It will be appreciated that a storage system in accordance with the present invention may be used for storage of any flowable granular material, such as salt, potash, pelletized material or even coal, in addition to various types of grains. The system is especially clean in that all dust generated by the filling operation is confined under the cover. Furthermore, while the system as designed for temporary storage, it is quite suitable for storing granular materials for extended periods of time. The system is much less expensive than conventional storage systems and requires little maintenance except for replacement of the cover. The average life of a typical cover is about ten years. The system is suitable for storing granular material in piles as small as about 5,000 bushels but is particularly advantageous for storage of larger piles from about 25,000 bushels up to about 3,000,000 bushels.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. Method of storing a flowable granular material comprising the steps of:
    positioning a pluraltiy of mating, flexible and impervious cover sections upon a support surface;
    securing said cover sections together to define a cover having a centrally located opening;
    grasping said cover in the region of said central opening and lifting the surrounding portion of said cover to a predetermined height; said cover sagging naturally from said height and being free to pull inwardly as necessary to accommodate said lifting;
    introducing said granular material into said opening until said granular material comes into contact with said cover;
    continuing said introduction to cause said granular product to lift said cover and carry it outwardly away from the point of said introduction, thereby defining a pile which extends along a normal angle or repose in an outward and downward direction from the point of said introduction and which is entirely covered by said cover throughout said introduction.

2. Method according to claim 1 wherein said cover sections are secured together by lacing.

3. Method according to claim 1 wherein said securing step includes the steps of bringing together mating edges of adjacent cover sections, folding one mating edge over the other to define a seam, and then passing a lacing material through said seam.

4. Method according to claim 1 wherein said introduction of said granular product continues until the peak of said pile reaches a height equal to said predetermined height.

5. Method according to claim 4 and further including the step of securing the perimeter of said cover after said pile has been completed.

6. Method according to any of claims 1–3 or 4 wherein the central portion of said cover is secured to an air permeable support structure, said method including the further step of aerating said pile by creating a suction force at said opening and causing a flow or air through said wall and said pile.

* * * * *